Dec. 8, 1964  F. H. BATTLE, JR  3,160,886
PULSE DECODING APPARATUS
Filed March 22, 1963                                    2 Sheets-Sheet 1

INVENTOR
Frederick H. Battle, Jr.
BY
ATTORNEYS

Dec. 8, 1964     F. H. BATTLE, JR     3,160,886
PULSE DECODING APPARATUS
Filed March 22, 1963     2 Sheets-Sheet 2

INVENTOR
Frederick H. Battle, Jr.
BY
ATTORNEYS

United States Patent Office 3,160,886
Patented Dec. 8, 1964

3,160,886
PULSE DECODING APPARATUS
Frederick H. Battle, Jr., Huntington Station, N.Y., assignor to Cutler-Hammer, Inc., Milwaukee, Wis., a corporation of Delaware
Filed Mar. 22, 1963, Ser. No. 267,301
9 Claims. (Cl. 343—106)

This invention relates to apparatus for decoding a scanning beam which is angle-coded by pulse modulations transmitted at intervals varying with the beam angle.

In application Serial No. 27,406 filed May 6, 1960, by Battle and Tatz for "Aircraft Landing System," a landing system is described employing one or more scanning beams pulse-coded as a function of the angle thereof. In the pulse coding system specifically described therein, the time spacing of successive angle-coding pulse modulations progressively varies as a predetermined function of the beam angle from a predetermined reference angle.

An airborne receiver for decoding the pulse spacings is described therein which includes a sweep generator. A linear sweep is started a predetermined interval after the arrival of a given pulse modulation and under the control thereof, and is stopped upon the arrival of the succeeding pulse modulation. Accordingly, the terminal sweep amplitude varies with the pulse spacing, and therefore with the angle represented thereby. An angle memory circuit is employed which stores a signal representing the then-existing angle of the aircraft from the scanning beam transmitter. As the angle of the aircraft with respect to the transmitter changes, it is necessary to change the angle memory voltage. This is accomplished by comparing the stored angle signal with the terminal sweep amplitudes to derive an error signal, and the error signal is used to correct the stored angle signal.

Due to the finite width of the scanning beam, the pulse spacings will change slightly during a given beam passage over the aircraft, and means are provided for integrating the individual error signals derived during a single beam passage to obtain a resultant error signal corresponding substantially to the difference between the angle at the center of the beam and the then-existing stored angle signal, and this resultant error signal is used to correct the stored angle signal.

Comparators are frequently subject to so-called "common mode" error when comparing voltages varying over a considerable range. In the comparator described in the above-mentioned application, the terminal sweep voltages and the stored angle signal vary over a range corresponding to angles from 0 to 20°, say 0 to 20 volts. Although a comparator can be adjusted to give precise decoding at a given level, there may be an error at other levels. This may be due to a departure from precise linearity of the characteristics of the comparing stages. Inasmuch as small angles are of particular importance during aircraft landing, precise adjustment at zero or some small angle may be employed to give greatest accuracy where it is most needed. However, it is desirable to maintain the same accuracy at any angle, insofar as practical.

The present invention provides an improved decoding circuit in which the error signals are developed with respect to a particular reference level regardless of angle, so that the comparator need function only over a small signal range. This facilitates the design of the comparator, and yields substantially the same accuracy of decoding throughout the range of pulse spacings for which the system is designed.

In accordance with the invention, the levels at which the sweeps start are controlled by the stored angle signal and vary therewith. The terminal values of the sweeps are then compared with a reference level representing the sweep terminal level which should exist if the stored angle signal is correct. Departure therefrom produce error signals which are used to correct the stored angle signal. During normal operation only small error signals are to be expected. Thus, the comparison of the terminal sweep values with the reference level requires only a small operating range in the comparator.

The invention is particularly designed and adapted for use with angle coding pulse modulations of the type described in the above-identified application, wherein each pulse modulation serves as a reference for the succeeding pulse modulation. However, it may also be useful with other types of pulse modulations, such as the type employing a regularly recurring series of reference pulse modulations, with additional pulse modulations therebetween whose spacings with respect to the reference pulse modulations vary with the beam angle.

The invention will be described in connection with a specific embodiment thereof, wherein further features and advantages will in part be pointed out and in part be apparent to those skilled in the art. In the drawings.

Figure 1:
FIG. 1 illustrates angle-coding pulses having a variable pulse-to-pulse spacing with which the invention may be employed.

Referring to FIG. 1, a series of pulses 10, 11, 12, etc. are shown in which the time spacing between each pulse and the next represents the then-existing beam angle with respect to a reference angle (such as horizontal). A fixed minimum spacing corresponds to the reference angle, and the variation from the minimum spacing is linear with angle. For illustrative purposes and not by way of limitation, in one specific embodiment the following equation applies:

$$\phi = (\text{pulse spacing} - 18\mu \text{ sec.}) \times 0.25 \text{ degree}/\mu\text{sec.} \quad (1)$$

Here $\phi$ is the beam angle with respect to horizontal. Eighteen microseconds ($\mu$sec.) is the pulse spacing corresponding to zero degrees. The range of pulse spacings is from 16 to 98 microseconds, corresponding to an angle range from $\frac{1}{2}°$ below horizontal to 20° above horizontal.

The pulses shown in FIG. 1 are video pulses at the output of a suitable receiver in the aircraft. Identification pulses may accompany the angle-coding pulses of the scanning beam, and may be processed by suitable known techniques to give the single series of angle-coding pulses shown in FIG. 1.

The change in spacing shown in FIG. 1 is exaggerated for clarity. Usually pulses will be transmitted very frequently, as the beam scans, so that the time spacing from one pulse to the next will change by a very small, but significant, amount.

Figure 2:
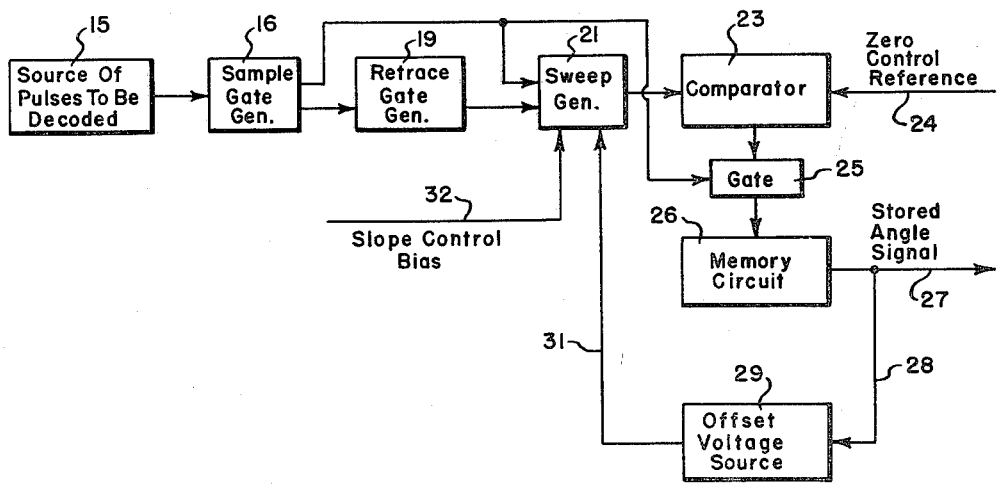
FIG. 2 is a block diagram of the overall decoding system in which the invention may be employed.
Figure 4:
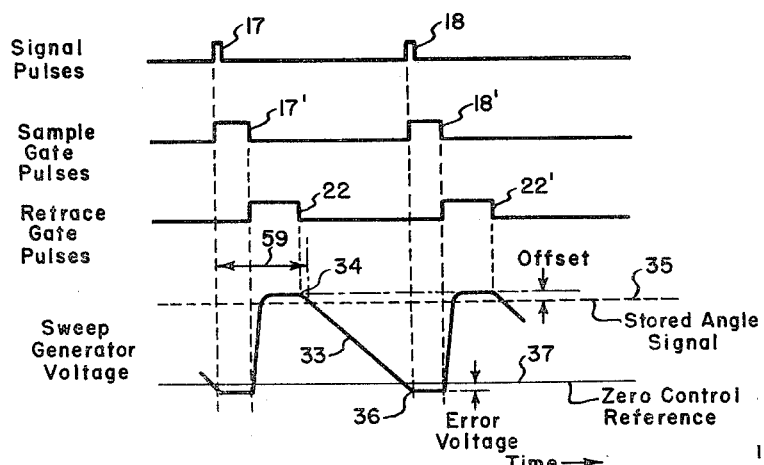
FIG. 4 shows waveforms explanatory of the operation of FIG. 3.

Referring to FIG. 2, block 15 represents a source of pulses to be decoded. The pulses are supplied to a sample gate generator 16 which produces a somewhat longer pulse from each pulse from source 15. The relationship is shown in FIG. 4, wherein pulses 17 and 18 represent two successive pulses from source 15, and pulses 17' and 18' represent sample gate pulses derived therefrom. It would be possible to use the received video pulses themselves, but these are commonly very short, say $\frac{1}{4}$ microsecond. Somewhat longer pulses are desirable for decoding purposes. Also, as will be explained later, the error signals are produced during the occurrence of the sample gates, and the length of the gates may be varied to change the length of time during which the error signal is applied to the subsequent memory circuits.

The sample gates are applied to retrace generator 19 which controls the retrace of the sweep generator 21. Retrace gate pulses are shown at 22 and 22' of FIG. 4, and it will be observed that their leading edges coincide with the trailing edges of the corresponding sample gate pulses. The sample gate pulses from 16 are also applied to sweep generator 21. As will be explained more in detail later, the sample gate pulses stop the respective sweeps, and the retrace gate pulses control the retrace of the sweeps and the start of the succeeding sweeps.

The output of sweep generator 21 is supplied to comparator 23 which compares the terminal sweep voltage with a zero control reference supplied thereto through line 24. A differential comparator using two balanced amplifier stages is suitable for the purpose. The resultant error signal is supplied through gate 25 to the memory circuits 26 to correct the stored angle signal therein as necessary. Sample gate pulses are applied to gate 25 so that correction is confined to the sample gate interval. The stored angle signal appears in the output line 27. This signal is supplied through line 28 to an offset voltage source 29 which adds a predetermined fixed voltage thereto, and the resultant offset stored angle signal in line 31 is supplied to the sweep generator 21 to control the starting levels of the sweeps.

A slope control bias is supplied to the sweep generator through line 32. This slope control bias, and the zero control reference in line 24, could be fixed. However, to insure the accuracy of decoding at all times, an auto-calibration circuit may be employed as described in application Serial No. 166,624, filed January 16, 1962, by Battle and Barlam entitled "Autocalibration of Decoding Receivers." As described therein, in between successive passages of a scanning beam over the aircraft, the decoding circuits are supplied alternatively with two accurately controlled series of calibration pulses whose spacings correspond to two different angles. At the same time, corresponding accurately controlled reference signals are applied to the decoder which represent the angle signal which should result from the decoding. Any error signal resulting from one calibration pulse series is used to control the level of the sweeps of the sweep generator, and any error signal resulting from the other test pulse series is used to control the slope of the sweeps. The zero control reference in line 24 may be derived from such a calibration procedure and serves to control the effective level of the sweeps of the sweep generator. Similarly, the slop control bias in line 32 derived from the autocalibration feature serves to control the slope of the sweeps of generator 21.

Referring to the last portion of FIG. 4, line 33 represents one linear sweep from the sweep generator 21. The starting point 34 corresponds to the trailing edge of retrace gate pulse 22. Dotted line 35 represents the then-existing stored angle signal in line 27 of FIG. 2. An offset voltage is added thereto, so that the initial voltage of the sweep at point 34 is equal to the stored angle signal plus the offset. The sweep 33 is stopped at point 36 at the leading edge of sample gate 18', corresponding to the time of arrival of pulse 18. Line 37 represents the zero control reference voltage. If the then-existing stored angle signal were correct, point 36 would fall on line 37. However, if the stored angle signal is in error, an error signal will be produced which is the difference between the voltage at point 36 and that of reference line 37. In the case illustrated, the angle represented by the spacing of signal pulses 17 and 18 is slightly greater than that represented by the stored angle signal, so that the error voltage is in the negative direction shown. If the angle represented by the spacing of the signal pulses were less than the stored angle signal, sweep 33 would terminate somewhat above line 37 and a positive error voltage would be developed.

In practice, line 37 is conveniently at nominally ground potential, with slight departures from ground as required by the auto-calibration referred to above.

Figure 3:
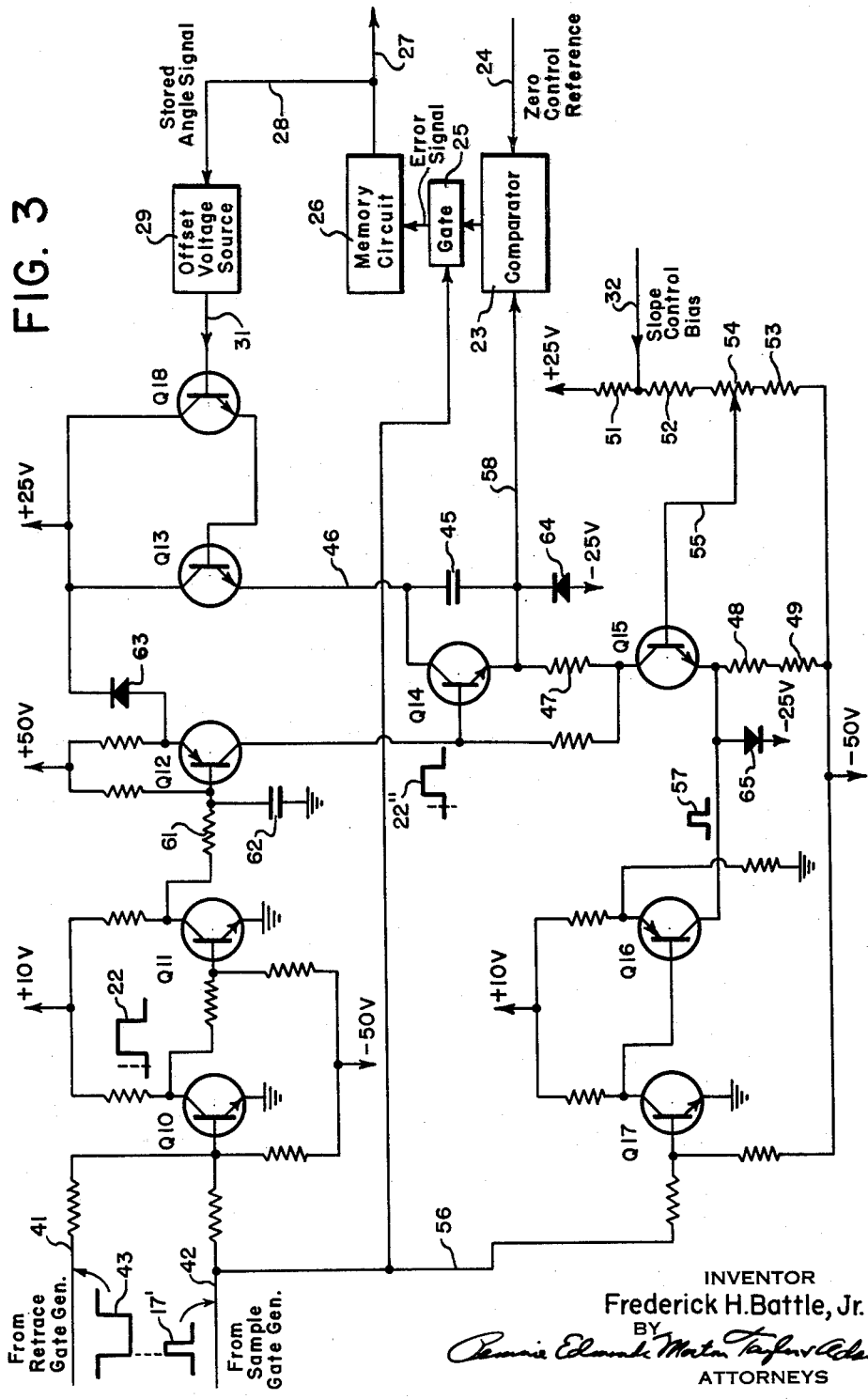
FIG. 3 is a circuit diagram of a sweep decoding arrangement in accordance with the invention.

Referring now to FIG. 3, a circuit diagram is shown for producing the results described above. Transistors of both NPN and PNP types are employed. When the emitter arrow on a given transistor points away from the base, an NPN type is indicated. When the emitter arrow points toward the base, a PNP type is indicated. Many of the individual transistor stages are known in the art, so that it will be unnecessary to describe those stages in detail.

Pulses from the retrace gate generator are supplied to the base of transistor Q10 through line 41, and sample gate pulses are supplied thereto through line 42. Q10 is normally conductive with its base positive to its emitter. Upon the occurrence of a negative-going pulse 43 from the retrace gate generator, Q10 would tend to be cut off. However, the simultaneous occurrence of a positive-going pulse 17' from the sample gate generator inhibits this action. Accordingly, Q10 is not cut off until the end of pulse 17'. Thus the collector output of Q10 is a positive-going pulse 22 whose leading edge coincides with the trailing edge of the sample gate pulse corresponding to that shown at 22 in FIG. 4.

It would be possible to use the trailing edge of a sample gate pulse to initiate a retrace gate pulse. However, the retrace gate pulse should terminate at a very accurately controlled time with respect to the occurrence of a signal pulse, and therefore with respect to the leading edge of a sample gate pulse. Further, it may be desirable to be able to adjust the duration of the sample gate pulses so as to obtain a proper charging time for correcting the stored angle signal, without affecting the trailing edge of the retrace gate pulses. Also, in one decoding receiver, the duration of the sample gate pulses is controlled by the amplitude of the received pulses so that pulses near the center of the scanning beam have a greater effect than those away from the center.

By initially generating pulses in the retrace gate generator 19 which start at the leading edge of the sample gate pulses, and have an accurately controlled length, and then using the sample gate pulses to blank out the early portion thereof, the trailing edges of the retrace gate pulses are unaffected. As the sample gate pulses increase in length, the retrace gate pulses will become shorter, but this is satisfactory so long as they are sufficiently long to complete the retrace of the sweep generator.

Q11 and Q12 function as amplifiers of the retrace gate pulses and deliver positive-going retrace gate pulses 22" to the base of Q14. Q14 functions to discharge capacitor 45 across which the sweep is produced. As shown in FIG. 4, the sweep progresses in a negative direction from its initial potential at point 34. This is the charge direction. Q14 becomes highly conductive upon the occurrence of a retrace gate pulse at the base thereof, and essentially short-circuits capacitor 45.

The initial sweep potential is controlled by transistors Q13 and Q18 connected as a cascaded emitter follower circuit. The stored angle signal in line 27 is supplied to the offset voltage source 29 which adds a predetermined voltage thereto. Source 29 may be of any suitable design, and conveniently may be controlled by a Zener diode so that an accurately maintained offset voltage is added to the stored angle signal. The resultant voltage is supplied to the base of Q18 and thence through Q13 to the top of capacitor 45 through line 46. Thus, line 46 is at the potential shown on point 34 in FIG. 4 at the beginning of a sweep. Upon the termination of a retrace gate, Q14 becomes non-conductive, removing the short-circuit across capacitor 45. The capacitor then charges through resistors 47, 48 and 49, under the control of transistor Q15 functioning as a constant current source.

The base of Q15 is connected to a voltage divider comprising resistors 51, 52, 53 and potentiometer 54.

The resistors 51, 52 and 53 limit the range of voltage variation of potentiometer 54 so that an accurate control potential may be obtained in line 55. By moving the slider of potentiometer 54, the bias applied to the base of Q15 may be adjusted to give the charging rate desired. The slope control bias described above is supplied through line 32 to the junction between resistors 51 and 52. This bias therefore changes the voltage level of potentiometer 54 so as to change the bias in line 55 when the autocalibration determines the need therefor.

The sweep is terminated by cutting off transistor Q15 upon the occurrence of a sample gate pulse. This is accomplished with the aid of transistors Q16 and Q17. The sample gate pulses are supplied to the base of Q17 through line 56. As here shown, Q17 functions as an amplifier and inverter. The collector output of Q17 is supplied to the base of Q16 yielding an amplified positive pluse output as shown at 57 corresponding to the input sample gate pulse in line 56. This output is supplied to the emitter of Q15. Upon the occurrence of a pulse 57, Q15 is cut off, thereupon stopping the charging of capacitor 45.

The output sweep voltage across capacitor 45 appears in line 58 and, from the description of the circuit, will be understood to correspond to that shown at the bottom of FIG. 4. It is desired to compare the terminal sweep voltage occurring during the sample gate intervals with the zero control reference, and use the resultant error voltage to correct the stored angle signal. This could be accomplished by supplying the sweep voltage to the comparator 23 only during the sample gate intervals. However, in this embodiment the entire sweep voltage is supplied to comparator 23 through line 58, and the zero control reference is supplied thereto through line 24. A gate 25 is inserted in the output line of the comparator and opened by sample gate pulses from line 56. Accordingly, the error signal is applied to the memory circuits 26 only during the sample gate intervals.

During a given beam passage, a considerable number of individual error signals will be supplied to the memory circuit. If the stored angle signal is correct, and represents the angle of the center of the beam, the error signals will be evenly distributed in positive and negative polarities, and their average will represent a zero error. If the angle memory signal is not correct, there will be a predominance of positive or negative error signals, and the average value will correspond to an error in one or the other directions, thereby serving to correct the stored angle signal. This operation is described in the aforesaid application Serial No. 27,406 and need not be repeated here.

Having described the general functioning of the circuit of FIG. 3, certain additional features will be mentioned.

The offset voltage indicated in FIG. 4 insures that there will be at least a short sweep for pulse spacings corresponding to a zero angle, and also allows for slight changes in the zero control reference (by calibration) while still maintaining proper decoding for a zero or small angle. If the offset were not employed, and the sweep 33 started at a voltage equal to that of the stored angle signal, for a zero angle the correct value of the stored angle signal would be zero volts. Accordingly, the starting and stopping of the sweep would occur simultaneously and make precise determination difficult. With the offset voltage at least a short sweep occurs under these conditions, so that there is always a definite terminal value which can be compared with the zero control reference. Also, the offset voltage allows for slight variations in the zero control reference when decoding angles near zero. The termination of the retrace gate pulses 22, 22′ is selected with respect to the offset voltage, so that when the sweep reaches the level 35, the time interval 59 corresponds to a spacing of pulses 17, 18 representing a zero angle. With the particular values here employed, this is 18 microseconds. In addition, the offset voltage allows a brief interval for the sweep to get started, so that any non-linearity at the start will not affect the accuracy of decoding.

From the above description it will be appreciated that the error signal gate 25 is reclosed or inhibited at the same time retrace begins. Thus a very slight delay in inhibiting gate 25 could result in faulty operation. To avoid this, a slight time delay is introduced in the retrace control circuit. In FIG. 3, the time delay is provided by the resistor-capacitance circuit 61, 62 at the input to Q12. This slightly delays the leading edge of retrace gate pulse 22″ with respect to the trailing edge of sample gate pulse 17′. The accompanying slight delay in the occurrence of that trailing edge of retrace pulse 22″ may be taken into account in determining the length of the pulses from retrace gate generator 19, or by calibration, etc.

In between successive beam passages, where there are no received pulses to be decoded, the potentials at various points in the circuit may depart considerably from those present during decoding. To prevent possible damage to the transistors, and to insure that the decoder is in condition for operation upon reception of pulses, clamping diodes are inserted as required to prevent excessive departures from operating levels. This is the purpose of diodes 63, 64, 65.

The voltages shown in FIG. 3 are those employed in one particular embodiment, and may be changed as desired for a particular application. The selection of circuit constants to yield the described operation will be clear to those skilled in the art.

During autocalibration as described above, source 15 may be arranged to supply the desired series of calibrating pulses to the decoder, and corresponding calibration signals may be applied to line 28 in lieu of the stored angle signal. The output of comparator 23 may then be used to develop suitable calibration error signals for controlling the zero control reference in line 24 and slope control bias in line 32, in the manner described in the aforesaid application Serial No. 166,624.

The invention has been described in connection with a specific embodiment thereof for use with a particular type of pulse coding system. Many modifications are possible within the spirit and scope of the invention, and the invention may be adapted for use with other pulse coding systems, as will be understood by those skilled in the art.

I claim:

1. In apparatus for decoding a scanning beam coded by pulse modulations transmitted at intervals varying with the beam angle, including a sweep generator and means for starting and stopping the sweeps thereof under the control of said pulse modulations, and an angle memory circuit for storing a signal representing the beam angle, the improvement which comprises
   (a) means for utilizing the stored angle signal to control the starting levels of the sweeps of the sweep generator,
   (b) and means for determining differences between the terminal values of the sweeps and a reference level to obtain error signals representing departures of the stored angle signal from the then-existing beam angle.

2. In apparatus for decoding a scanning beam coded by pulse modulations transmitted at intervals varying with the beam angle, including a sweep generator and means for starting and stopping the sweeps thereof under the control of said pulse modulations, and an angle memory circuit for storing a signal representing the beam angle, the improvement which comprises
   (a) means for utilizing the stored angle signal to control the starting levels of the sweeps of the sweep generator,
   (b) means for comparing the terminal values of the sweeps with a reference level to obtain corresponding error signals, (c) and means for utilizing said error signals to correct the stored angle signal.

3. Apparatus in accordance with claim 2 including means for adding an offset value to said stored angle signal and utilizing the resultant signal to vary the starting levels of said sweeps in accordance therewith.

4. In apparatus for decoding a scanning beam coded by pulse modulations transmitted at intervals varying with the beam angle with respect to a predetermined reference angle and having a predetermined spacing interval corresponding to the reference angle, including a sweep generator and means for starting and stopping the sweeps thereof under the control of pulses corresponding to said pulse modulations, and an angle memory circuit for storing a signal representing the beam angle, the improvement which comprises (a) means for starting said sweeps a predetermined interval after the occurrence of the respective control pulses which is less than said predetermined spacing interval, (b) means for adding an offset value to the stored angle signal and utilizing the resultant signal to vary the starting levels of said sweeps in accordance therewith, (c) and means for determining differences between the terminal values of the sweeps and a reference level to obtain error signals representing departures of the stored angle signal from the then-existing beam angle.

5. In apparatus for decoding a scanning beam coded by pulse modulations transmitted at intervals varying with the beam angle with respect to a predetermined reference angle and having a predetermined spacing interval corresponding to the reference angle, including a sweep generator and mans for starting and stopping the sweeps thereof under the control of pulses corresponding to said pulse mdulations, and an angle memory circuit for storing a signal representing the beam angle, the improvement which comprises (a) means for starting said sweeps a predetermined interval after the occurrence of the respective control pulses which is less than said predetermined spacing interval, (b) means for adding an offset value to the stored angle signal and utilizing the resultant signal to vary the starting levels of said sweeps in accordance therewith, (c) means for comparing the terminal values of the sweeps with a reference level to obtain corresponding error signals, (d) and means for utilizing said error signals to correct the stored angle signal.

6. In apparatus for decoding a scanning beam coded by pulse modulations transmitted at intervals varying with the beam angle with respect to a predetermined reference angle and having a predetermined spacing interval corresponding to the reference angle, including a sweep generator and means for starting and stopping the sweeps thereof under the control of pulses corresponding to said pulse modulations, and an angle memory circuit for storing a signal representing the beam angle, the improvement which comprises (a) means for starting said sweeps a predetermined interval after the occurrence of the respective control pulses which is less than said predetermined spacing interval, (b) means for adding an offset value to the stored angle signal and utilizing the resultant signal to vary the starting levels of said sweeps in accordance therewith, (c) said offset value being predetermined to yield an instantaneous sweep value corresponding to the stored angle signal at the end of said predetermined spacing interval, (d) means for establishing a reference level corresponding to the terminal sweep level when the stored angle signal corresponds to the then-existing beam angle, (e) means for comparing the terminal sweep levels with said reference level to obtain corresponding error signals, (f) and means for utilizing said error signals to correct the stored angle signal.

7. Apparatus in accordance with claim 6 in which said reference level corresponds substantially to the terminal sweep level for said reference angle.

8. Apparatus for decoding a scanning beam coded by a series of pulse modulations during a beam scan in which the time spacing of successive angle-coding pulse modulations progressively varies as a predetermined function of the beam angle from a reference angle, a predetermined spacing interval corresponding to the reference angle, which comprises (a) a sweep generator, (b) means for utilizing said pulse modulations to stop the sweeps of the sweep generator in substantially fixed time relationship with the occurrence of respective pulse modulations and for starting the respectively succeeding sweeps at a substantially fixed interval thereafter, (c) said fixed interval being less than said predetermined spacing interval corresponding to the reference angle, (d) an angle memory circuit for storing a signal representing the beam angle, (e) means for adding an offset value to the stored angle signal and utilizing the resultant signal to vary the starting levels of said sweeps in accordance therewith, (f) said offset value being predetermined to yield an instantaneous sweep value corresponding to the stored angle signal at the end of said predetermined spacing interval, (g) means for establishing a reference level corresponding to the terminal sweep level when the stored angle signal corresponds to the then-existing beam angle, (h) means for comparing the terminal sweep levels with said reference level to obtain corresponding error signals, (i) and means for utilizing said error signals to correct the stored angle signal.

9. Apparatus in accordance with claim 8 in which said reference level corresponds substantially to the terminal sweep level for said reference angle.

No references cited.